United States Patent
Fluehr et al.

(10) Patent No.: US 10,447,794 B2
(45) Date of Patent: Oct. 15, 2019

(54) WEB BROWSER TRACKING

(71) Applicant: Cision US Inc., Chicago, IL (US)

(72) Inventors: Timothy Michael Fluehr, Gambrills, MD (US); Mark James Heys, Dunkirk, MD (US)

(73) Assignee: Cision US Inc., Chicago, IL (US)

( * ) Notice: Subject to any disclaimer, the term of this patent is extended or adjusted under 35 U.S.C. 154(b) by 211 days.

(21) Appl. No.: 15/702,748

(22) Filed: Sep. 12, 2017

(65) Prior Publication Data

US 2018/0007153 A1    Jan. 4, 2018

Related U.S. Application Data

(62) Division of application No. 14/061,489, filed on Oct. 23, 2013, now Pat. No. 9,794,357.

(51) Int. Cl.
*H04L 29/08*    (2006.01)
*G06F 11/00*    (2006.01)
*G06F 11/34*    (2006.01)

(52) U.S. Cl.
CPC ............ *H04L 67/22* (2013.01); *G06F 11/006* (2013.01); *G06F 11/3466* (2013.01); *G06F 11/3438* (2013.01); *G06F 11/3476* (2013.01); *G06F 11/3495* (2013.01); *G06F 2201/83* (2013.01); *G06F 2201/875* (2013.01)

(58) Field of Classification Search
CPC ............... G06F 11/3438; G06F 11/006; G06F 11/3476; G06F 2201/83; G06F 2201/875; H04L 67/22
USPC ........................................................ 709/224
See application file for complete search history.

(56) References Cited

U.S. PATENT DOCUMENTS

| | | | |
|---|---|---|---|
| 7,028,001 | B1 | 4/2006 | Muthuswamy |
| 2011/0035784 | A1* | 2/2011 | Jakobsson ........... H04L 63/1466 726/2 |
| 2011/0185016 | A1* | 7/2011 | Kandasamy ........... G06Q 10/06 709/203 |
| 2011/0185051 | A1 | 7/2011 | Reno |
| 2013/0054433 | A1 | 2/2013 | Giard et al. |
| 2014/0351418 | A1* | 11/2014 | Toubiana ............... G06Q 30/02 709/224 |

FOREIGN PATENT DOCUMENTS

| | | |
|---|---|---|
| EP | 1244016 | 9/2002 |
| FR | 2979509 | 3/2013 |
| WO | 0139012 | 5/2001 |

OTHER PUBLICATIONS

European Patent Office, Extended Search Report regarding EP Appl. No. 14190161.1-1954, dated Apr. 7, 2015, 9 pgs.

* cited by examiner

*Primary Examiner* — June Y Sison
*Assistant Examiner* — Adam A Cooney
(74) *Attorney, Agent, or Firm* — Greenberg Traurig, LLP

(57) ABSTRACT

A technique for tracking web browsing activity of a client device that includes storing, in a memory, a client profile having a client identifier associated therewith, providing a client device with a cache file having the client identifier embedded therein, receiving from the client device an identification of a client action and the client identifier, and updating the client profile to include the identification of the client action.

13 Claims, 3 Drawing Sheets

WEB BROWSER TRACKING

BACKGROUND

Publishers of web pages often desire specific data regarding how, and which, visitors interact with a website. They frequently use this information to present their content in a manner that is conducive to achieving a website goal (e.g., educating visitors about a given topic, directing visitors to a specific subset of the information on the website, selling goods or services, and/or directing a visitor's attention to one or more included advertisements).

Web analytics systems provide a way for publishers to obtain detailed information regarding visitor interactions with their site. For example, an analytics provider can supply a website publisher with script code for insertion into one or more web pages for which analytics information is desired. The scripts can direct a visitor's web browser to transmit information to the analytics provider's tracking server, to supply a more complete picture of visitor behavior. In order to track usage at an individual level, such scripts have traditionally needed to create a small file known as a "cookie" on the user's computer. More recently, however, web browsers are becomingly increasingly stricter in accepting cookies—in some cases blocking cookies altogether—thereby preventing conventional tracking. Embodiments of the present invention are directed to alternative techniques for tracking web browsing activity.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

An embodiment of the present invention is directed to a method, in a tracking server, for tracking web browsing activity of a client device accessing a vendor server. The method includes receiving a request for tracking software from the client device, the request for the tracking software being prompted by software sent to the client device by the vendor server. The method further includes transmitting the tracking software to the client device, wherein the tracking software is configured to execute upon receipt by the client device and prompt the client device to determine whether the client device has stored therein a particular web cache file, and to prompt the client device to request the creation of a new web cache file from the tracking server, if the client device does not have the web cache file stored therein. The method further includes receiving a request for the new web cache file from the client device, establishing a client identifier associated with the client device, storing in a memory of the tracking server a client profile associated with the client identifier, embedding the client identifier in the new web cache file, transmitting the new web cache file to the client device, receiving the client identifier and an identification of a client action from the client device, and updating the client profile to include the identification of the client action.

Another embodiment of the present invention is directed to a method, in a tracking server, for tracking web browsing activity of a client device accessing a vendor server. The method includes receiving a request for tracking software from the client device, the request for the tracking software being prompted by software sent to the client device by the vendor server. The method further includes transmitting the tracking software to the client device, where the tracking software is configured to execute upon receipt by the client device, to, in turn, prompt the client device to determine whether the client device has stored therein a web cache file having embedded therein a client identifier associated with the client device, and to prompt the client device to confirm with the tracking server whether the client has a current version of the web cache file. The method further includes receiving a request from the client device to confirm whether it has the current version of the web cache file, responding to the client device that it has the current version of the web cache file, receiving the client identifier and an identification of a client action from the client device, and storing, in a memory of the tracking server, the identification of the client action into a client profile associated with the client identifier.

Another embodiment of the present invention is directed to a system for tracking web browsing activity. The system includes a client device having a web browser running thereon and a client storage device for storing a web cache file for the web browser. The web cache file has embedded therein a fingerprint that is unique to the client device. The client device is configured to transmit a request for tracking software to a tracking server, where the request for the tracking software is prompted by launch software sent to the client device by the vendor server. The system also includes the tracking server, which is communicatively coupled with the client device and includes a tracking server storage device for storing a client profile for the client device. The client profile has associated therewith the fingerprint, and further describes zero or more client actions. The tracking server receives the request for the tracking software from the client device and transmits the tracking software to the client device. The client device receives the tracking software from the tracking server and executes the tracking software. The tracking software, upon execution, prompts the client device to transmit a request to the tracking server to confirm whether the client has a current version of the web cache file. The tracking server receives the request to confirm whether the client has the current version of the web cache file and responds to the client device that it has the current version of the web cache file. The client device, upon confirmation that it has the current version of the web cache file, transmits the fingerprint and an identification of a client action to the tracking server. The tracking server receives the fingerprint from the client device and updates the client profile to include the identification of the client action.

Another embodiment of the present invention is directed to a system for tracking web browsing activity. The system includes a client device having a web browser running thereon and a client storage device for storing for the web browser a web cache file having embedded therein a fingerprint unique to the client device. The client device determines whether the web cache is currently stored in the client storage device and requests a new web cache file from the tracking server if the web cache file is not stored in the client storage device. The system also includes the tracking server, which is communicatively coupled with the client device and includes a tracking server storage device for storing a plurality of client profiles, each of the client profiles having associated therewith a unique fingerprint and descriptions of zero or more client actions. The tracking server creates a new client profile and fingerprint for the client device and embeds the fingerprint in the new web cache file, in response to the request for the new web cache file. The tracking server also transmits the new web cache file to the client device. The client device transmits the fingerprint and an identification of a client action to the tracking server, and the tracking server updates the client profile to include the identification of the client action.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Figure 1:
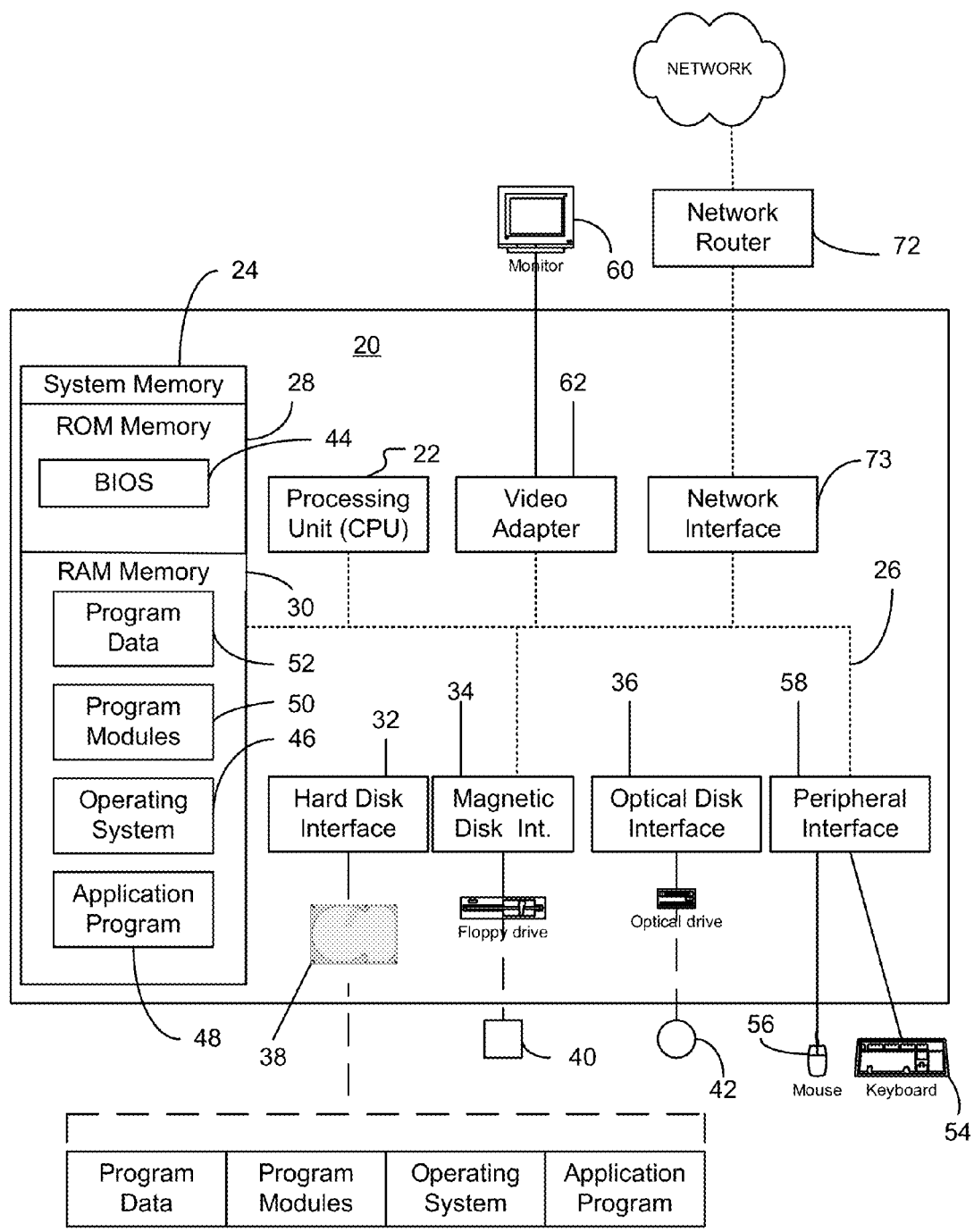
FIG. 1 is a block diagram of an exemplary operating environment for implementing various embodiments of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention, as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure various aspects of the present invention.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various embodiments of the present invention.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

With reference to FIG. 1, an exemplary system for implementing embodiments includes a general purpose computing system environment 20, such as a desktop computer, laptop, smartphone, tablet, or any other such device having the ability to execute instructions, such as those stored within a non-transient, computer-readable medium. Furthermore, while described and illustrated in the context of a single computing system 20, those skilled in the art will also appreciate that the various tasks described hereinafter may be practiced in a distributed environment having multiple computing systems 20 linked via a local or wide-area network in which the executable instructions may be associated with and/or executed by one or more of multiple computing systems 20.

In its most basic configuration, computing system environment 20 typically includes at least one processing unit 22 and at least one memory 24, which may be linked via a bus 26. Depending on the exact configuration and type of computing system environment, memory 24 may be volatile (such as RAM 30), non-volatile (such as ROM 28, flash memory, etc.) or some combination of the two. Computing system environment 20 may have additional features and/or functionality. For example, computing system environment 20 may also include additional storage (removable and/or non-removable) including, but not limited to, magnetic or optical disks, tape drives and/or flash drives. Such additional memory devices may be made accessible to the computing system environment 20 by means of, for example, a hard disk drive interface 32, a magnetic disk drive interface 34, and/or an optical disk drive interface 36. As will be understood, these devices, which would be linked to the system bus 26, respectively, allow for reading from and writing to a hard disk 38, reading from or writing to a removable magnetic disk 40, and/or for reading from or writing to a removable optical disk 42, such as a CD/DVD ROM or other optical media. The drive interfaces and their associated computer-readable media allow for the nonvolatile storage of computer readable instructions, data structures, program modules and other data for the computing system environment 20. Those skilled in the art will further appreciate that other types of computer readable media that can store data may be used for this same purpose. Examples of such media devices include, but are not limited to, magnetic cassettes, flash memory cards, digital videodisks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 20.

A number of program modules may be stored in one or more of the memory/media devices. For example, a basic input/output system (BIOS) 44, containing the basic routines that help to transfer information between elements within the computing system environment 20, such as during start-up, may be stored in ROM 28. Similarly, RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example, via a network connection.

An end-user, e.g. a consumer, may enter commands and information into the computing system environment 20 through input devices such as a keyboard 54 and/or a pointing device 56. While not illustrated, other input devices may include a microphone, a joystick, a game pad, a scanner, etc. These and other input devices would typically be connected to the processing unit 22 by means of a peripheral interface 58 which, in turn, would be coupled to bus 26. Input devices may be directly or indirectly connected to processor 22 via interfaces such as, for example, a parallel port, game port, firewire, or a universal serial bus (USB). To view information from the computing system environment 20, a monitor 60 or other type of display device may also be connected to bus 26 via an interface, such as via video adapter 62. In addition to the monitor 60, the computing system environment 20 may also include other peripheral output devices, not shown, such as speakers and printers.

The computing system environment 20 may also utilize logical connections to one or more computing system environments. In this regard, it will be appreciated that the remote computing system environment may, like computing system environment 20, be any type of device having processing capabilities. Again, it will be appreciated that the remote computing system environment need not be implemented as a single device but may be implemented in a manner such that the tasks performed by the remote computing system environment are distributed to a plurality of computing system environments linked through a communication network.

For performing tasks as needed, the remote computing system environment may include many or all of the elements described above relative to the computing system environment 20. Communications between the computing system environment 20 and the remote computing system environment may be exchanged via a further processing device, such a network router 72, that is responsible for network routing. Communications with the network router 72 may be performed via a network interface component 73. Thus, within such a networked environment, e.g., the Internet, World Wide Web, LAN, or other like type of wired or wireless network, it will be appreciated that program modules depicted relative to the computing system environment 20, or portions thereof, may be stored in the memory storage device(s) of the remote computing system environment.

Generally speaking, various embodiments provide for systems, apparatuses and methods that primarily use web cache files, rather than the conventional cookies, to track web browsing activity. This is achieved in part by providing the browser with a cache file having an embedded fingerprint that uniquely identifies the browser and its associated client device to one or more servers. Such technology enables individualized, yet optionally anonymous, tracking of web browsing activity regardless of the browser's willingness to accept cookies.

Figure 2:
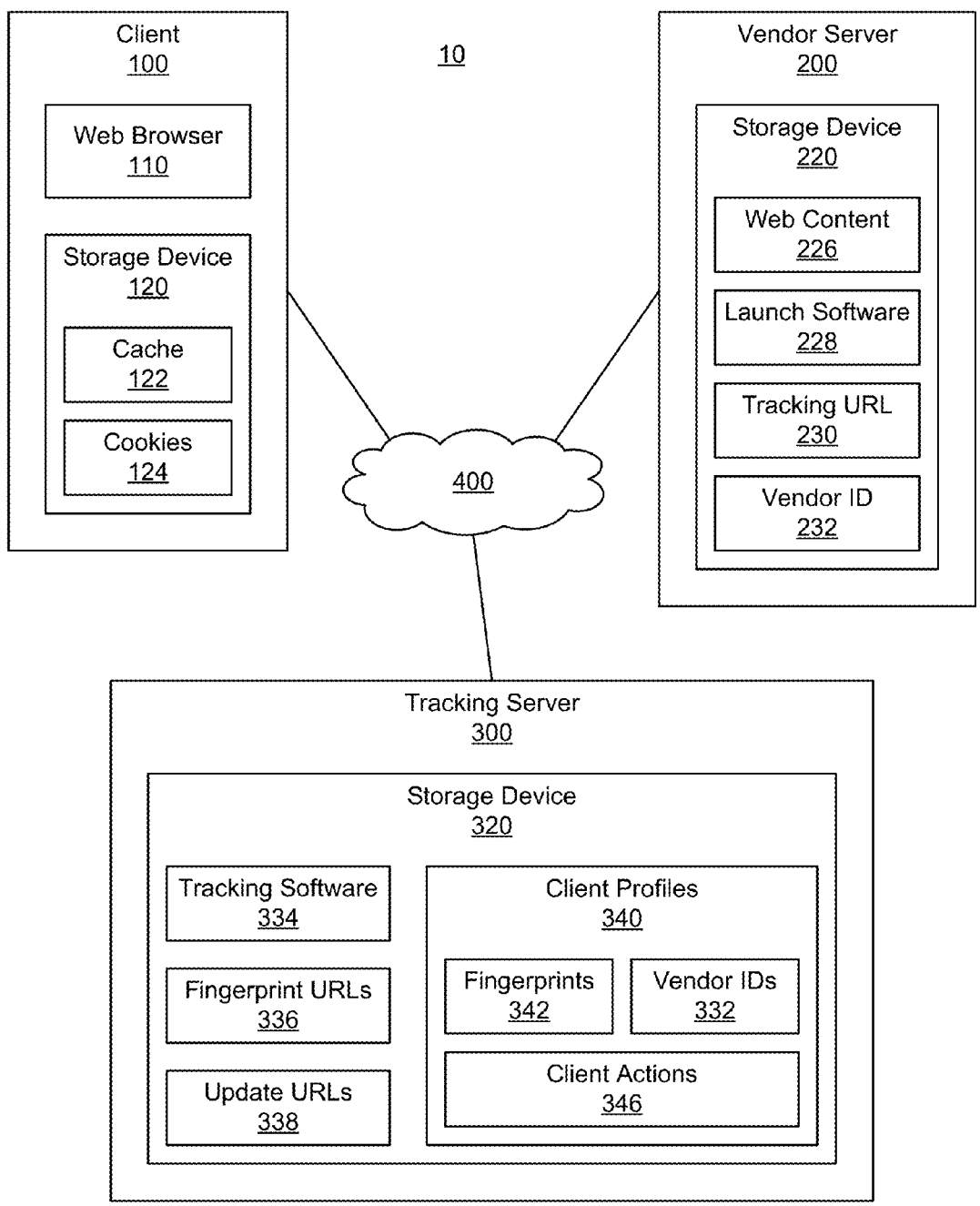
FIG. 2 illustrates a system for tracking web browsing activity, in accordance with an embodiment of the present invention.

FIG. 2 illustrates a system 10 for tracking web browsing activity, in accordance with an embodiment of the present invention. System 10 includes a client device 100, which may be a computing system environment 20, such as that depicted in FIG. 1. Client 100 includes a web browser 110 for accessing, downloading, displaying and/or interacting with web pages over a network 400 from a web server, such as vendor server 200. Client 100 also includes a storage device 120 for storing, inter alia, computer readable instructions, downloaded web content, cache 122 and cookies 124. Storage device 120 may comprise one or more of the storage devices described with respect to computing system environment 20 above.

System 10 also includes vendor server 200, which may be a computing system environment 20, such as that depicted in FIG. 1. Vendor server 200 is communicatively coupled with client 100 and operates, at least in part, as a web server, serving requested web pages and web content to clients such as client 100. Vendor server 200 also includes a storage device 220 for storing, inter alia, computer readable instructions, web content 226, launch software 228, tracking URLs 230 and an associated vendor identifier (ID) 232. Storage device 220 may comprise one or more of the storage devices described with respect to computing system environment 20 above.

System 10 also includes a tracking server 300, which may be a computing system environment 20, such as that depicted in FIG. 1. Tracking server 300 is communicatively coupled with client 100 and vendor server 200, and operates, at least in part, to track at least a portion of the web browsing activity of client 100 relative to vendor server 200. Tracking server 300 also includes a storage device 320 for storing, inter alia, computer readable instructions, tracking software 334, fingerprint URLs 336, update URLs 338 and client profiles 340. The client profiles 340 may in turn comprise fingerprints 342, vendor IDs 332, client actions 346, dates of the client actions 346, times of the client actions, 346 and/or referring URLs, some of which are discussed in greater detail below. Storage device 220 may comprise one or more of the storage devices described with respect to computing system environment 20 above.

Figure 3:
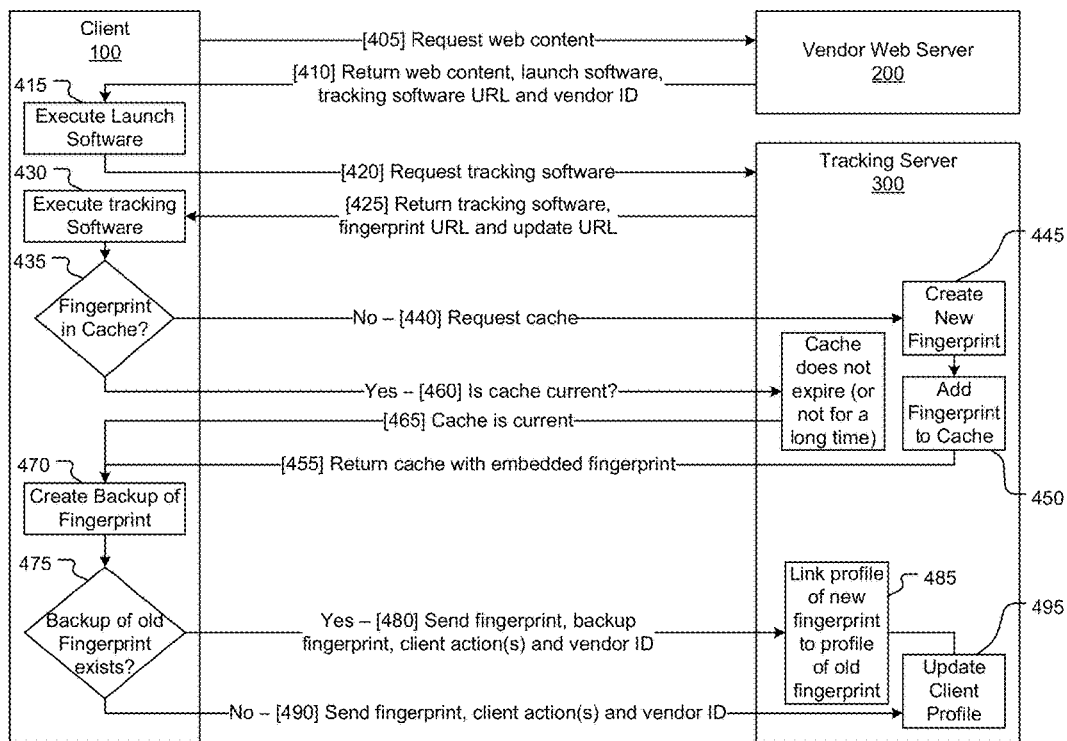
FIG. 3 illustrates a flow diagram of a process for tracking web browsing activity, in accordance with various embodiments of the present invention.

FIG. 3 illustrates a flow diagram of a process for tracking web browsing activity, in accordance with various embodiments of the present invention. FIG. 3 illustrates example steps utilized by various embodiments of the present technology and includes processes that, in various embodiments, are carried out by a processor under the control of computer-readable and computer-executable instructions. The computer-readable and computer-executable instructions may reside, for example, in non-transient data storage features, such as storage devices 38, 40 and 42 of FIG. 1. Although specific operations are disclosed in FIG. 3, such operations serve as examples. That is, embodiments are well suited to performing various other operations or variations of the operations recited in FIG. 3. It is appreciated that the operations shown in FIG. 3 may be performed in an order different than presented, and that not all of the operations in FIG. 3 may need to be performed. Where helpful for the purposes of illustration, and not for limitation, FIG. 3 will be described with reference to the other figures, which illustrate hypothetical situations in which embodiments may be implemented, utilizing the components of FIGS. 1 and 2 as well.

In one embodiment of the present invention, the process of FIG. 3 begins at step 405, when the web browser 110 of client 100 requests web content 226 from vendor server 200. Web content 226 may be a web page, a document, multimedia content, or any combination thereof. At step 410, vendor server 200 responds by returning the requested web content 226, together with launch software 228, a tracking URL 230 and a vendor ID 232. The tracking URL 230 comprises a URL identifying a particular location or file on tracking server 300. The vendor ID 232 comprises an identifier, such as a globally unique identifier (GUID), that uniquely identifies the vendor associated with the vendor server 200. The launch software 228 may be, for example, a JavaScript that the web browser 110 of client 100 executes upon receipt. Upon execution, the launch software 228 uses the tracking URL 230 to contact the tracking server 300, to request tracking software 334 (step 420).

At step 425, the tracking server 300 responds to the request for tracking software by transmitting the tracking software 334, a fingerprint URL 336 and an update URL 338 to the client 100. The fingerprint URL 336 comprises a URL identifying a particular location or file on tracking server 300 for obtaining/checking a fingerprint. The update URL 338 comprises a URL identifying a particular location or file on tracking server 300 for updating the tracking server 300 later on in the process. The tracking software 334 may be, for example, a JavaScript that the web browser 110 of client 100 executes upon receipt. Upon execution, the tracking software 334 uses the fingerprint URL, which in turn causes the web browser 110 to determine whether the client 100 has a particular cache file in its cache 122 (step 435). If not, the process proceeds to step 440, where the tracking software's use of the fingerprint URL causes web browser 110 of client 100 to contact the tracking server 300, to request a new cache file from the tracking server. At step 445, in response to the request for the new cache file, the tracking server may create a new client profile 340 associated with the client 100, including a new fingerprint 342 that uniquely identifies the client 100 to the tracking server 300. In one embodiment, the fingerprint 342 may comprise an alphanumeric string of characters and/or a GUID. At step 450, the tracking server embeds the newly created fingerprint 342 into a cache file and, at step 455, tracking server 300 returns the cache with the embedded fingerprint 342 to the client 100, which the client 100 stores in its cache 122.

Alternatively, if at step 435 the web browser 110 determines that the client 100 has the cache file in its cache 122, the process proceeds to step 460, where the tracking software 334 prompts the web browser 110 of client 100 to use the fingerprint URL to contact the tracking server 300, to check whether the cache file that was found in step 435 is current. In order to simplify the tracking process as much as possible, tracking server prefers to maintain a continuing association between a single fingerprint 342 and client 100. As such, it is configured so that a cache file containing an embedded fingerprint never expires or, at a minimum, does not expire for an unusually long amount of time (e.g. ten years). Accordingly, at step 465, tracking server 300 confirms that the cache file is current.

In their most basic form, some embodiments of the present invention rely upon the assumption that the client 100 will maintain its cache 122 indefinitely. However, it is appreciated that some users, as a matter of computer housekeeping, may periodically delete or purge their cache files 122. Doing so, without any failsafe in place, would cause the cache file with the embedded fingerprint discussed above to be lost. Accordingly, various embodiments provide techniques for backing up the fingerprint-embedded cache file, thereby guarding against the possibility against a cache purge. In particular, at step 470, upon receipt of the fingerprint-embedded cache file from the tracking server 300, the tracking software 334 running on the client 100 creates a backup of the new fingerprint. In one embodiment, the fingerprint is backed up as a cookie. Thus, if the cache is deleted, client 100 still has a record of its fingerprint elsewhere. At step 475, the tracking software running on the client 100 checks to see whether a backup of an old fingerprint exists on client 100 (e.g. as a cookie). If yes, the tracking software sends both the new and the backup fingerprints, together with the vendor ID received in step 410 and an identification of one or more client actions (discussed in more detail below), to tracking server 300 (step 480). At step 485, the tracking server 300 then links the client profile 340 associated with the new fingerprint to the client profile 340 associated with the backup fingerprint. Thus, even though an old fingerprint for the same client 100 has been abandoned in favor of a new one, e.g. by virtue of the client's cache 122 being deleted, an association with the old client profile 340 is preserved. In the event a backup of an old fingerprint does not exist on the client 100, the tracking software sends just the new fingerprint, the vendor ID and the identification of the client action(s) to tracking server 300 (step 490).

Regardless of whether a backup fingerprint was found, at step 495, the tracking server updates the client profile 340 associated with client 100 to include the client action(s) 346 and the vendor ID 332. The client action(s) may be any one of a series of trackable or loggable interactions that the client 100 may have with vendor 200, including but not limited to the URL(s) visited, file(s) downloaded, mouse location(s) on a web page, and text typed into a field. Each client action 346 may have associated therewith a date and/or time stamp. Optionally, the tracking server 300 may then transmit to the vender the client actions 346 that pertain to the vendor.

Thus, embodiments provide a means to overcome the shortcomings of tracking systems that rely completely on cookies, which can be easily blocked by the browser or the user. Specifically, instead of primarily relying upon cookies, embodiments embed a unique fingerprint in cache that is stored on the client machine. Since cache generally is not blocked and is rarely if ever deleted, it is more likely to be preserved from browsing session to browsing session, thereby enabling a longer and more cohesive tracking record.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a tracking server, a method for tracking web browsing activity of a client device accessing a vendor server associated with a vendor, comprising:
  receiving a request for tracking software from the client device, the request for the tracking software being prompted by software sent to the client device by the vendor server;
  transmitting the tracking software to the client device, wherein the tracking software is configured to execute upon receipt by the client device and prompt the client device to determine whether the client device has stored therein a web cache file having embedded therein a client identifier associated with the client device, and prompt the client device to confirm with the tracking server whether the client has a current version of the web cache file;
receiving a request from the client device to confirm whether the client has the current version of the web cache file;
responding to the client device that it has the current version of the web cache file;
receiving the client identifier and an identification of a client action from the client device;
storing, in a memory of the tracking server, the identification of the client action into a client profile associated with the client identifier.

2. The method as recited in claim 1, further comprising:
receiving, with the client identifier and the identification of the client action, a vendor identifier associated with the vendor;
updating the client profile to include the vendor identifier; and
transmitting the identification of the client action to the vendor.

3. The method as recited in claim 1, wherein the client identifier comprises a globally unique identifier (GUID).

4. The method as recited in claim 1, wherein the client profile further includes one or more of the client identifier, a vendor identifier, a referring URL, a date of the client action, or a time of the client action.

5. The method as recited in claim 1, wherein the client action comprises the accessing of a web page.

6. The method as recited in claim 1, wherein the client action comprises the hovering of a cursor over an object on a web page.

7. The method as recited in claim 1, wherein the client action comprises the downloading of a file.

8. The method as recited in claim 1, wherein the tracking software is configured to create a backup of the client identifier after the client device has confirmed that the client device has the current version of the web cache file.

9. A system for tracking web browsing activity, comprising:
a client device having a web browser running thereon and a client storage device for storing a web cache file for the web browser, the web cache file having embedded therein a fingerprint, wherein the fingerprint is unique to the client device, the client device configured to:
transmit a request for tracking software to a tracking server, the request for the tracking software being prompted by launch software sent to the client device by the vendor server; and
the tracking server, communicatively coupled with the client device and comprising a tracking server storage device for storing a client profile for the client device, the client profile having associated therewith the fingerprint, the client profile further describing zero or more client actions, wherein the tracking server is configured to:
receive the request for the tracking software from the client device; and
transmit the tracking software to the client device,
the client device being further configured to:
receive the tracking software from the tracking server; and
execute the tracking software, the tracking software configured upon execution to prompt the client device to transmit a request to the tracking server to confirm whether the client has a current version of the web cache file,
the tracking server being further configured to:
receive from the client device the request to confirm whether the client has the current version of the web cache file; and
respond to the client device that it has the current version of the web cache file,
the client device, upon confirmation that it has the current version of the web cache file, being further configured to transmit the fingerprint and an identification of a client action to the tracking server,
the tracking server being further configured to:
receive the fingerprint from the client device; and
update the client profile to include the identification of the client action.

10. The system as recited in claim 9 further comprising:
the vendor web server, having a vendor server storage device for storing web content and a vendor identifier, the vendor server being configured to transmit the web content and the vendor identifier to the client device in response to a request for the web content from the client device,
the client device being further configured to transmit the vendor identifier to the tracking server, and
the tracking server being further configured to update the client profile to include the vendor identifier.

11. The system as recited in claim 10, in which the vendor server is further configured to transmit the launch software to the client device in response to the request for the web content from the client device.

12. The system as recited in claim 11, wherein at least one of the launch software and the tracking software is a JavaScript.

13. The system as recited in claim 10, wherein the tracking software is configured to create a backup of the fingerprint after the client device has confirmed that the client device has the current version of the web cache file.

* * * * *